June 19, 1923.
E. A. KLEIN
FUMIGATION TENT
Filed March 29, 1922    5 Sheets-Sheet 1
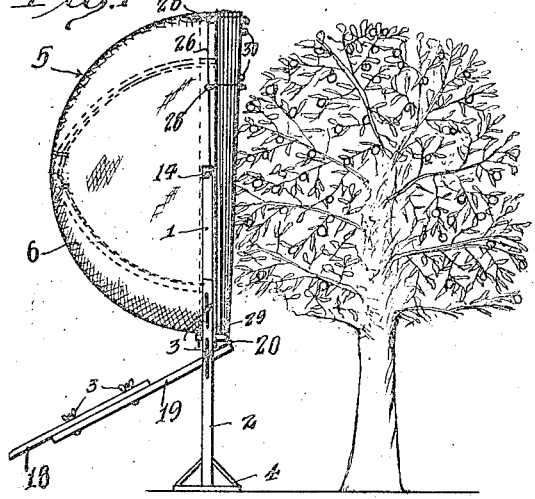
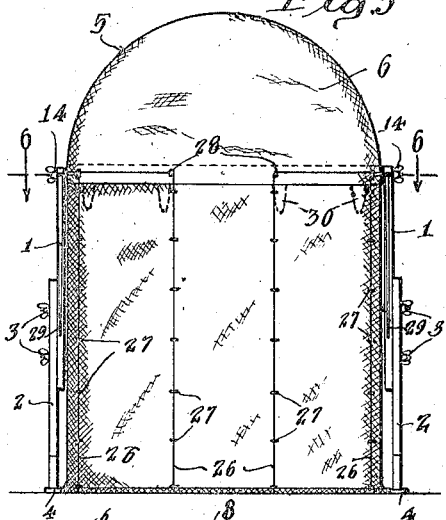
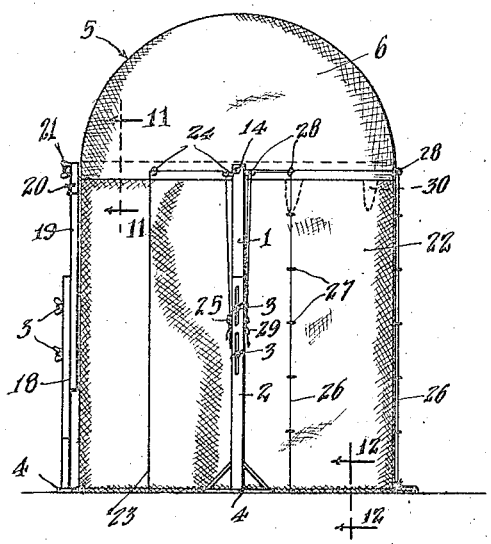
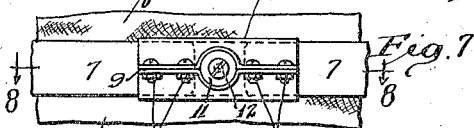
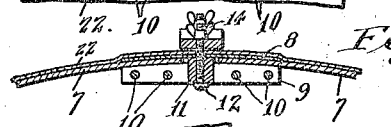
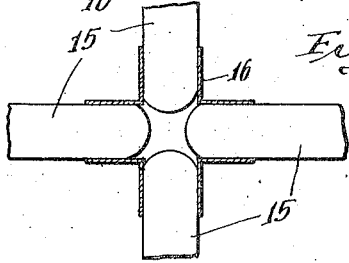
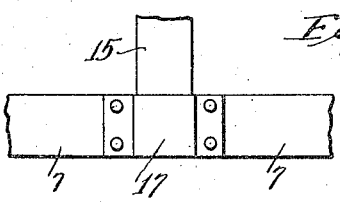
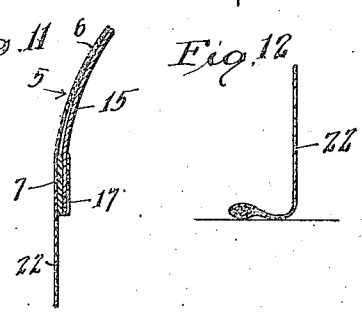
Inventor
Emil A. Klein
By Lyon & Lyon
attys

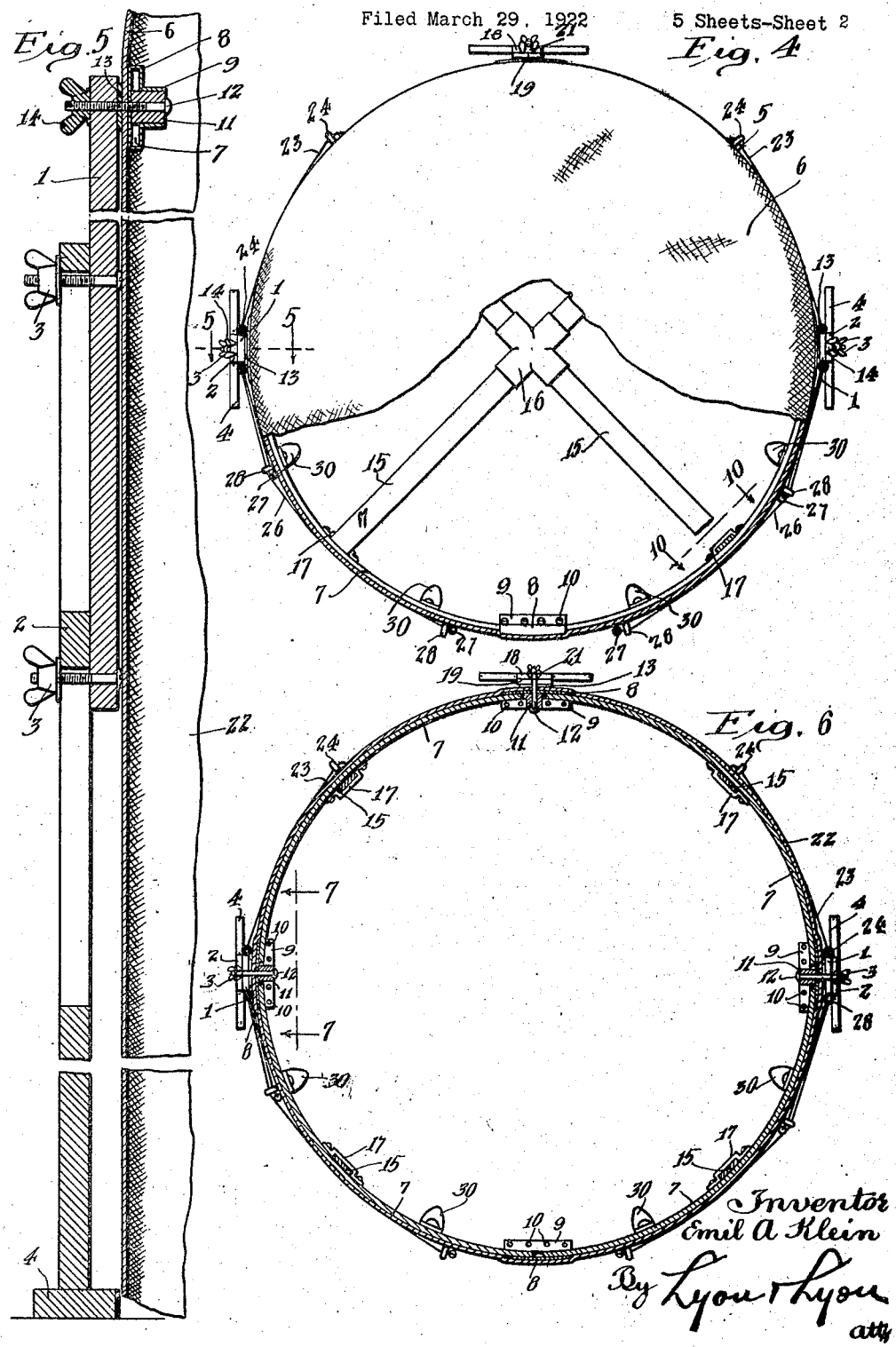

June 19, 1923.
E. A. KLEIN
FUMIGATION TENT
Filed March 29, 1922   5 Sheets-Sheet 3
1,459,217
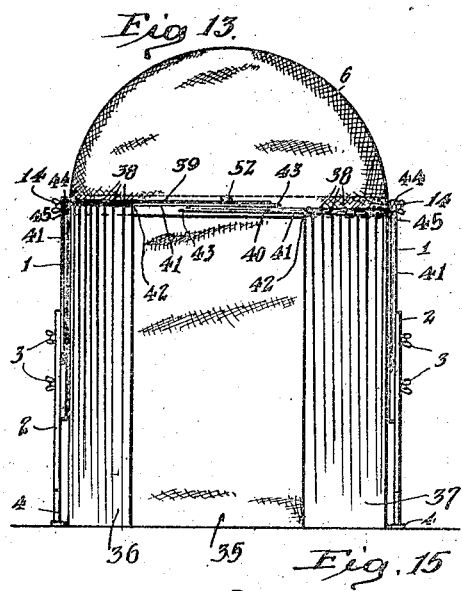
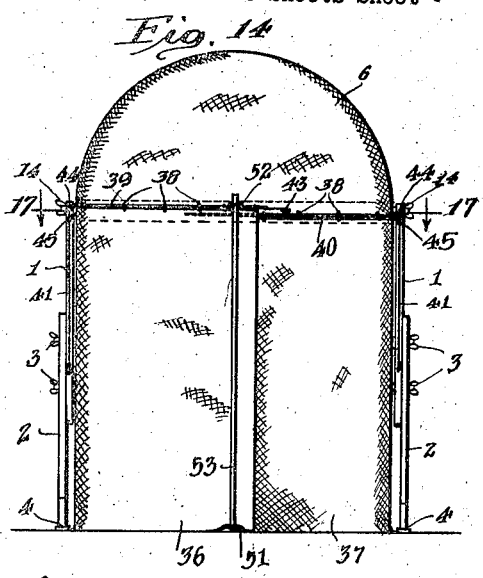
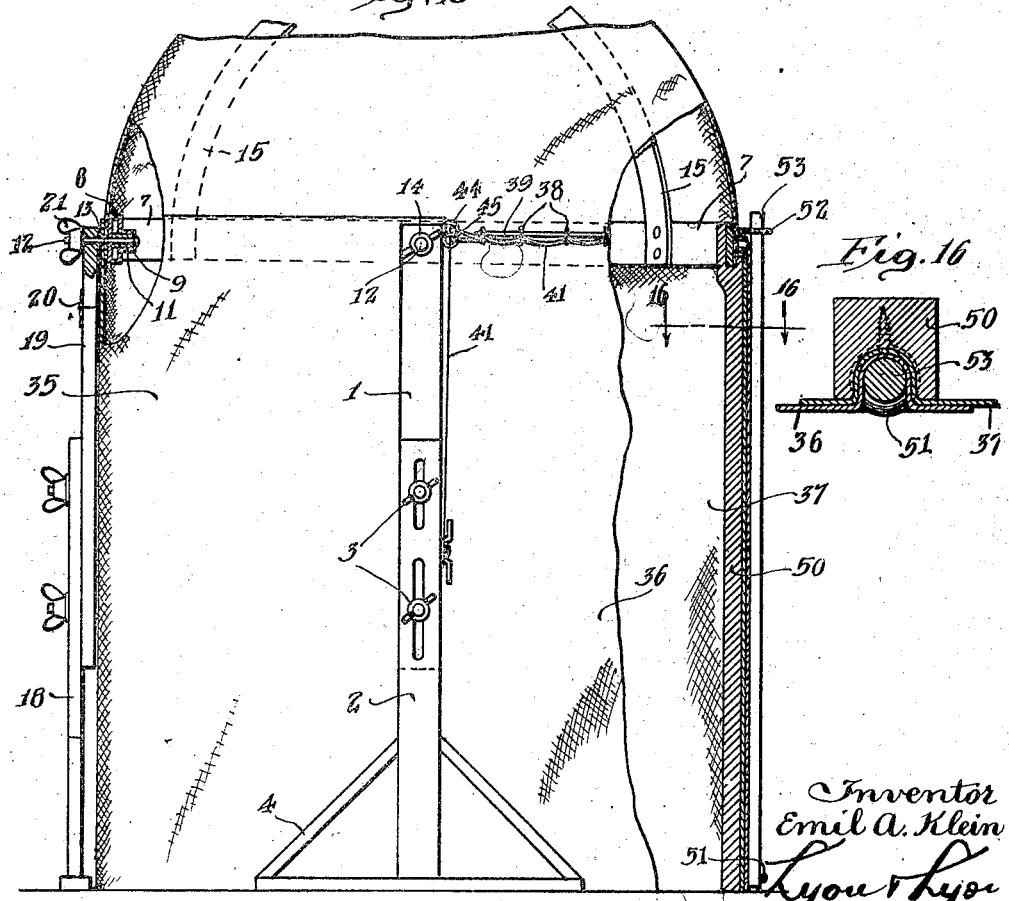
Inventor
Emil A. Klein
By Lyon & Lyon
atty.

June 19, 1923.
E. A. KLEIN
1,459,217
FUMIGATION TENT
Filed March 29, 1922.   5 Sheets-Sheet 4
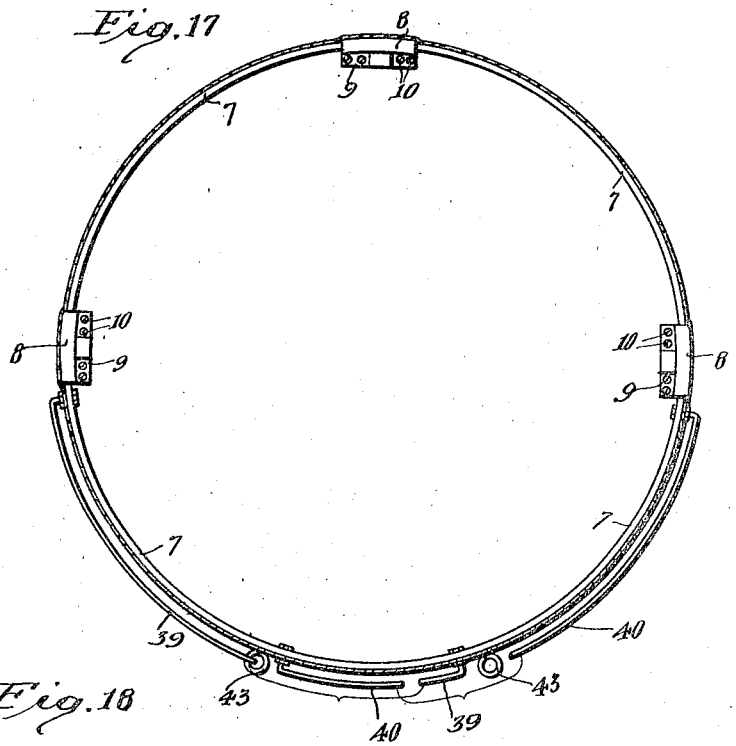
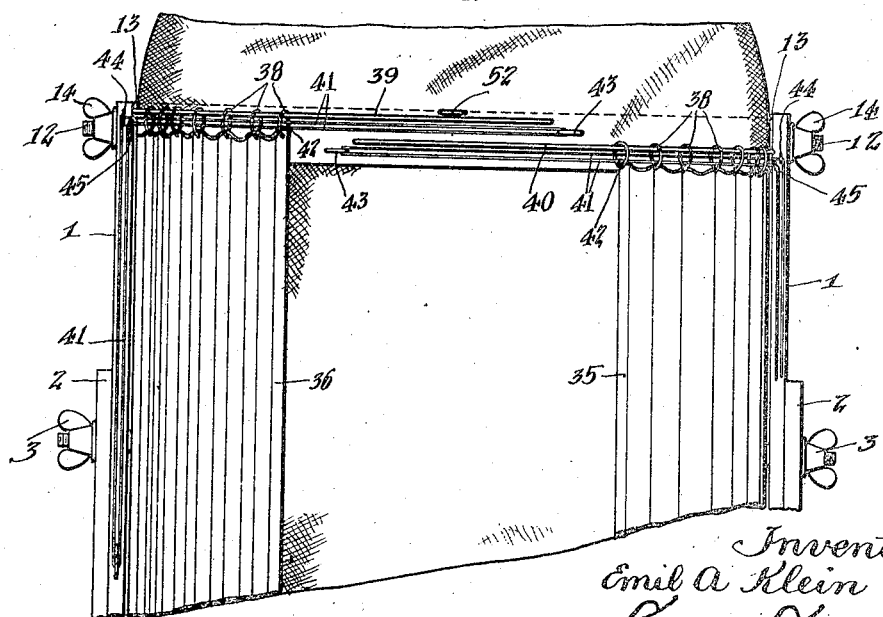

June 19, 1923.
E. A. KLEIN
FUMIGATION TENT
Filed March 29, 1922  5 Sheets-Sheet 5
1,459,217
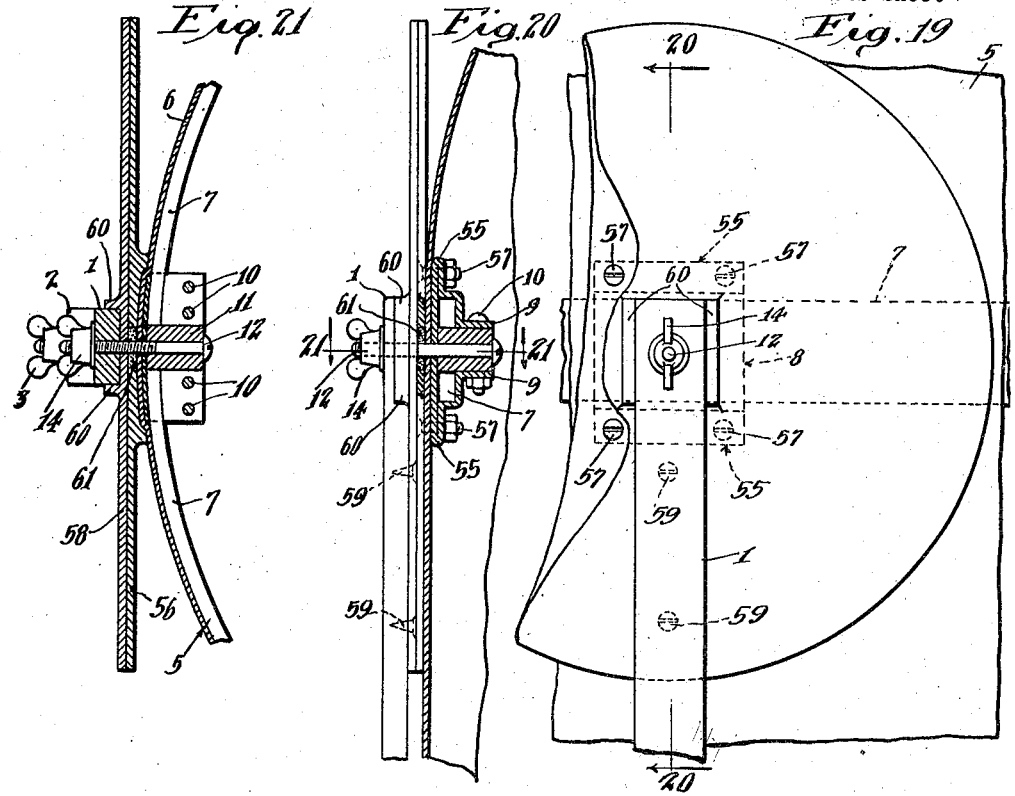
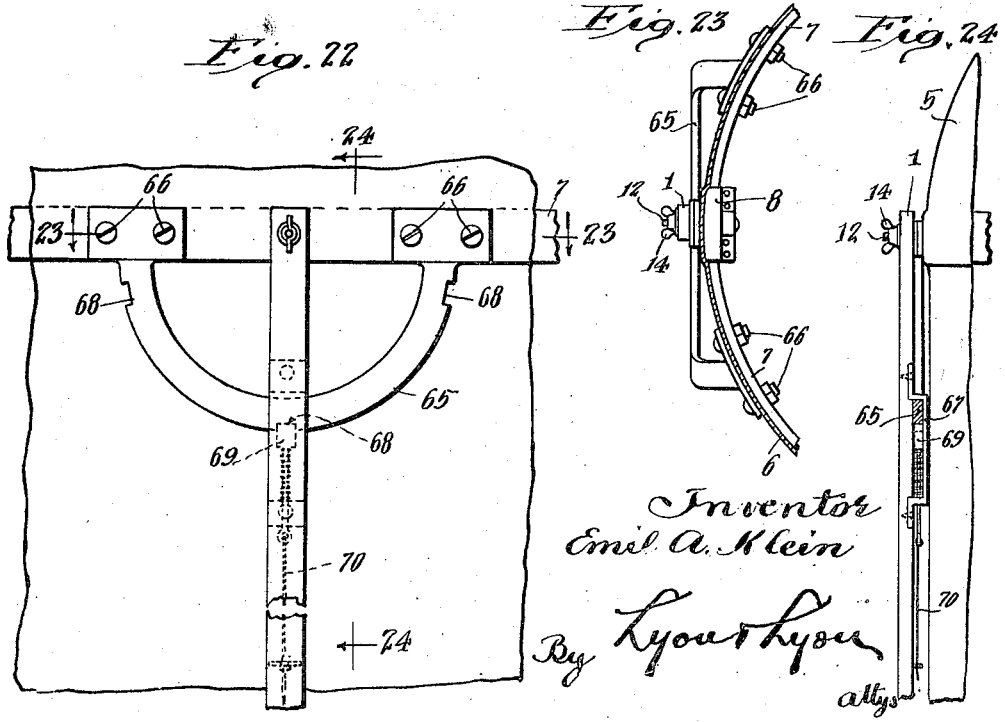
Inventor
Emil A. Klein
By Lyon & Lyon
attys Patented June 19, 1923.

1,459,217

UNITED STATES PATENT OFFICE.

EMIL A. KLEIN, OF LOS ANGELES, CALIFORNIA.

FUMIGATION TENT.

Application filed March 29, 1922. Serial No. 547,831.

*To all whom it may concern:*

Be it known that I, EMIL A. KLEIN, a citizen of the United States, residing at Los Angeles, in the county of Los Angeles and State of California, have invented a new and useful Fumigation Tent, of which the following is a specification.

This invention relates to fumigation tents and is particularly directed to a portable device adapted for use in the fumigation of trees.

An object of the invention is to provide a fumigation tent of simple construction which may easily and quickly be applied to the tree to be fumigated and which will provide a gas tight tent entirely supported free of the tree.

A further object is to provide a fumigation tent which may be placed over a tree without subjecting the tree to the weight of any part of the tent and which when in use will allow the contained gas to come into contact with all parts of the tree.

Another object is to provide a fumigation tent having a permanently extended pivoted top which may be swung to position over the top of the tree, and a fabric skirt member subsequently manipulated to entirely enclose the tree.

Various other objects and advantages will be more fully apparent from the following description of the accompanying drawings which form a part of this disclosure, and which illustrate a preferred form of embodiment of the invention.

Of the drawings:

Fig. 1 is a side elevation of the tent in normal condition and illustrating the first step in its application to a tree.

Fig. 2 is a side elevation of the tent in position of use.

Fig. 3 is a front elevation.

Fig. 4 is a top plan view with part of the covering fabric broken away.

Fig. 5 is an enlarged section on line 5—5 of Fig. 4.

Fig. 6 is a plan section on line 6—6 of Fig. 3.

Fig. 7 is an enlarged detail view taken on line 7—7, of Fig. 6.

Fig. 8 is a section on line 8—8 of Fig. 7.

Fig. 9 is a detail section through the bracket connecting the ribs of the top member of the tent.

Fig. 10 is an enlarged detail view taken on line 10—10 of Fig. 4.

Fig. 11 is a detail section on line 11—11 of Fig. 2.

Fig. 12 is a detail section on line 12—12 of Fig. 2.

Fig. 13 is a front elevation of a modified form of tent having its side walls formed to provide opposed sections functioning as draw curtains.

Fig. 14 is a similar elevation showing the sections drawn together in overlapping relation.

Fig. 15 is a side elevation of the tent shown in Figs. 13–14, partly broken and in section.

Fig. 16 is an enlarged detail section on line 16—16 of Fig. 15.

Fig. 17 is a plan section on line 17—17 of Fig. 14.

Fig. 18 is an enlarged portion of Fig. 13 showing in detail the curtain supporting and manipulating means.

Fig. 19 is an enlarged detail elevation of a modified form of pivotal connection of the supporting uprights to the top member.

Fig. 20 is a vertical section on line 20—20 of Fig. 19.

Fig. 21 is a plan section on line 21—21 of Fig. 20.

Fig. 22 is an elevation of still another modified form of pivotal connection.

Fig. 23 is a plan section on line 23—23 of Fig. 22, and

Fig. 24 is a vertical section on line 24—24 of Fig. 22.

In fumigation tents of the general type heretofore used great inconvenience has been experienced in applying the tent to trees, and with tents consisting principally of loose fabric coverings it has been impossible to apply the tent without dragging the fabric over the tree, in which instance the weight of the fabric tends to injure the tree and by bearing directly against the outer leaves and branches prevents the gas reaching all portions of the tree.

In the tent of the present invention these detrimental features are eliminated first by providing a tent having a permanently extended top which supports the entire weight of the tent free from contact with the tree, and second by so constructing the tent that it may be applied or removed without any part thereof bearing against or being dragged over the tree.

Referring particularly to Figs. 1 to 12, there is illustrated a tent having two relatively spaced vertical supports or standards each consisting of two members, 1, 2 extensibly united by means of elongated slots and cooperating clamp devices 3, the members 2 having suitable bases 4.

A permanently extended semi-spherical top member, indicated generally by the reference numeral 5, is horizontally pivoted on the upper portions of the members 1 so as to swing from a substantially vertical normal position as shown in Fig. 1, to a horizontal position of use as shown in Figs. 2 and 3.

The specific construction of said top member permits it to be readily disassembled for packing and shipping and while this construction is preferable it will be understood that in so far as the broad scope of the present invention is concerned various other constructions providing a permanently extended top may be substituted.

As illustrated the top member 5 comprises a skeleton frame-work covered with a gas proof fabric 6, said framework consisting of a circular hoop 7 which is constructed of sections clamped together by clamp members 8. Said clamp members are preferably formed of sheet metal bent to form a tubular body portion into which the opposed ends of the hoop sections extend (see Figs. 5, 7, 8,) and the meeting edges of the inner wall of said body portion are bent inwardly to form flanges 9 clamped together by bolts 10 to clamp the ends of the respective hoop sections. The clamp members which are adjacent the respective supporting uprights each have their flanges 9 formed to receive a bearing sleeve 11 having a horizontal bore through which a pivot bolt 12 passes. Said bolt passes through an orifice in the opposite side wall of the clamp member and through an orifice in the upper portion of the respective upright, (see Figs. 5, 6 and 8) a washer 13 surrounding the bolt between the top and said upright and a wing nut 14 engaging the outer end of the bolt. This structure provides a pivotal mounting of the top upon the uprights.

For supporting the fabric of the top member in extended position I provide bowed ribs 15, the upper ends of which engage in a cross-fitting 16, with the lower end of each rib seated in a pocket-fitting 17 secured to the inner surface of each of the hoop sections 7.

An extensible leg connected to the top member between the vertical supports, and at the rear of the tent, comprises two relatively extensible members 18, 19 connected together in the same manner as the vertical uprights previously described, the upper member 19 having a hinged portion 20 which is connected to the top in the same manner as are the vertical uprights, but in this instance the wing nut 21 is preferably tightened to prevent a pivotal action.

Connected to the top fabric 6 is a depending skirt member 22 of gas proof fabric, the lower edge of which may if desired have a hem filled with sand or other material so as to insure a close contact of the side walls of the tent with the ground.

Means are provided for manipulating the skirt member, the preferable means illustrated consisting of ropes or cables 23 attached to the lower edge of the back portion of the skirt and leading through eyes or pulleys 24 to cleats 25 on the respective members 1 of the uprights, and other ropes or cables 26 attached to the lower edge of the front portion of the skirt and leading through series of rings 27 attached to the skirt and through eyes or pulleys 28 on the top member to cleats 29 on the members 1 of the respective uprights, (see Figs. 2 and 3). This arrangement brings the ropes to positions at opposite sides of the tent at the uprights where they are easily accessible for manipulation by the operators who move the tent into place by lifting the uprights from the ground and bodily carrying the entire tent.

Spaced at intervals along the front half of the hoop member 7 of the top I provide relatively short limbs 30 projecting downwardly, these limbs being for the purpose of supporting the folded skirt member 22 when the top is swung to normal vertical position as illustrated in Fig. 1 so as not to obstruct the opening of the top member.

In use the operators, lifting on the vertical uprights, bodily move the tent to position towards a tree while the top is in vertical position as in Fig. 1, and until the lower edge of said top engages the tree trunk, thus bringing the pivotal center of the top member approximately in alignment with the radial center of the crown of the tree with approximately half of the tree extending into the top. The supporting uprights are then rested upon the ground and the top member swung to horizontal position over the tree by manipulation of the rear leg member. The ropes are then released to allow a lowering of the side walls and form an imperforate gas tight tent as shown in Figs. 2 and 3.

It will be evident that by this operation the tent has been applied to the tree without dragging any part of the fabric over and in contact with the leaves or branches and that the entire tent is supported free of the trees permitting the fumigation gas to reach every portion of the tree.

In the tent illustrated in Figs. 13 to 18, I provide a top member pivotally supported upon extensible vertical supports of the same construction as previously described and having the rear extensible and hinged leg member. The skirt member 35 of this modified form of tent instead of being raised and lowered, is formed to provide opposed sections 36, 37 to be horizontally manipulated in the manner of draw curtains. The sections are formed continuous with the back portion of the skirt member and when closed the vertical marginal edges of the sections are in overlapping relation. Each section has a series of curtain rings 38 attached at spaced intervals along its top edge, those of the section 36 being slidable on a rod 39 and those of the section 37 being slidable on a rod 40. The rods 39, 40 are secured to the hoop member of the top and are spaced therefrom with their forward ends in overlapping relation as illustrated in Figs. 17 and 18.

The ropes or cables 41 operable to manipulate the curtain sections 36—37, are each secured to the upper forward corner 42 of the respective curtain section, one cable run passing through an eye or pulley 43, back through the several curtain rings 38 and through an eye or pulley 44 on the respective vertical upright, and downwardly to a cleat thereon, the other cable run extending from the corner 42 back through the several curtain rings 38 and through an eye or pulley 45, and then downwardly to said cleat, the ends of the cable being joined or not as desired. By this arrangement the opposed curtain sections 36 and 37 may be pulled together in overlapping relation to close the tent.

Means are provided for securing together the overlapping edges of the opposed sections and for supporting the front edge of the top member. Such means comprises a leg member 50 having a forked upper end to engage the hoop member of the top (see Fig. 15) with its front surface longitudinally grooved (see Fig. 16). An eye 51 at the lower end of the leg 50 surrounds the groove and an eye 52 is secured to the hoop member of the top in vertical alignment with the groove. A clamp rod 53 is threaded upwardly through the eye 52 and its lower end is then threaded downwardly through the eye 51, the rod forcing the two plies of fabric into the groove to clamp the edge portions of the two curtain sections 36—37 together.

In Figs. 19 to 21, there is illustrated a modified form of pivotal connection of the supporting upright 1 to the top member 5. In this structure the clamp members 8 have vertically extended flanges 55 and a circular disc 56 is clamped to the top member 5 by bolts 57 extending through the fabric and through the flanges 55. A companion disc 58 is secured to the upright 1 by screws 59 and has flanges 60 engaging opposite edges of said upright.

The disc 56 has a central orifice to receive a packing washer 61 and the parts are held together by the pivot bolt 12. By this construction the top member may be swung to various positions as in the previously described construction, while the large cooperating surfaces of the discs provide a more substantial structure and will prevent a side swaying of the tent.

The structure illustrated in Figs. 22 to 24 also will prevent side swaying and further provides a means for locking the top member 5 of the tent in various positions. In this form of device I provide a quadrant member 65 which is secured at its opposite ends to the hoop sections 7 by bolts 66 with its intermediate portion slidably engaging in a bracket 67 secured to the upright 1. The quadrant has relatively spaced notches 68 in which a spring lock plunger 69 engages. Said plunger is slidably retained in the bracket 67 and is manually operated to release the quadrant 65, preferably by a cord 70 secured to the lower end of the plunger and extending downwardly to a point within reach of the operator.

While the mechanism here shown and described, is well adapted to fulfil the objects primarily stated, it is to be understood that it is not intended to confine the invention thereto, for it is susceptible of embodiment in various other forms, all coming within the scope of the claims which follow.

What is claimed is as follows:

1. In a fumigation tent the combination including relatively spaced vertical supports, a permanently extended top member horizontally pivoted to the upper portions of said supports, a fabric skirt member attached to the top member and extending to the ground to form the side walls of the tent, and means for manipulating the skirt member.

2. In a fumigation tent the combination including relatively spaced vertical supports, a permanently extended top member horizontally pivoted to the upper portions of said supports, a fabric skirt member attached to the top member and extending to the ground to form the side walls of the tent, means for manipulating the skirt member, and a leg member connected to the top between the supports and functioning to maintain the top in horizontal position.

3. In a fumigation tent the combination including relatively spaced vertical supports, a permanently extended top member comprising a framework and a fabric cover and horizontally pivoted to the upper portions of the supports, said top member being adapted, when in vertical position, to receive one side of a tree and when swung to horizontal position, to cover the top portion of the tree, a fabric skirt member extending from the top member to the ground to entirely enclose the tree, and means for manipulating the skirt member.

4. In a fumigation tent the combination including relatively spaced vertical supports, a permanently extended semi-spherical top member pivoted to swing horizontally on the upper portions of the supports, a fabric skirt member connected to the top member and extending to the ground to form the side walls of the tent, and means for raising and lowering the skirt member.

5. In a fumigation tent the combination including relatively spaced vertical supports, a permanently extended semi-spherical top member pivoted to swing horizontally on the upper portions of the supports, a fabric skirt member connected to the top member and extending to the ground to form the side walls of the tent, means for raising and lowering the skirt member, and means carried by the top member for supporting the raised skirt member when the top is in vertical position.

Signed at Los Angeles, California, this 10th day of January, 1922.

EMIL A. KLEIN.

Witnesses:
CLARENCE B. FOSTER,
L. BELLE WEAVER.